United States Patent [19]

Nudelman et al.

[11] 4,133,693

[45] Jan. 9, 1979

[54] PROCESS FOR PRODUCING CEMENT

[76] Inventors: Boris I. Nudelman, Chilanzar, kvartal 8, 27, kv. 48; Ilya Y. Simma, Trety Saperny proezd, 29a; Ida T. Uvarova-Nistratova, ulitsa Vrevskaya, proezd 2, 11; Vitaly I. Lisbaron, Chilanzar, kvartal 6, 2, kv. 9; Grigory I. Kalantarov, ulitsa Mukimi, 3, kv. 50; Vakel K. Imangulov, Chilanzar, Pervy proezd Sun-Yat-Sena, 2, all of Tashkent, U.S.S.R.

[21] Appl. No.: 847,925

[22] Filed: Nov. 2, 1977

[30] Foreign Application Priority Data

Jun. 10, 1977 [SU] U.S.S.R. .................. 2486703

[51] Int. Cl.$^2$ .................................. C04B 7/02
[52] U.S. Cl. .................... 106/100; 106/102
[58] Field of Search .............. 106/100, 102, 104

[56] References Cited

U.S. PATENT DOCUMENTS

| | | | |
|---|---|---|---|
| 3,826,664 | 7/1974 | Grylicki et al. | 106/104 |
| 4,028,126 | 6/1977 | Mori et al. | 106/100 |
| 4,043,746 | 8/1977 | Ritzmann | 106/100 |

*Primary Examiner*—James Poer
*Attorney, Agent, or Firm*—Burgess, Ryan and Wayne

[57] ABSTRACT

A process for producing cement comprises grinding of a mixture of raw components containing calcium chloride. The resulting raw mixture is subjected to calcination at a temperature within the range of from 1,000 to 1,100° C to produce a clinker which is then crushed at a temperature of from 900 to 1,100° C. The crushed clinker is fractionated at a temperature of from 1,000 to 1,100° C with a stream of the fuel combustion products at the speed thereof of from 6 to 30 m/sec. Two clinker fractions are thus obtained, namely: a fraction with a particle size of from 3 to 20 mm and a fraction with a particle size of from 0.1 to 3 mm. Each fraction is separately desalted at a temperature of from 900 to 1,100° C by way of contacting with a stream of the heating agent comprising the fuel combustion products. The resulting desalted clinker fractions are cooled and ground.

The process for producing cement according to the present invention features stable conditions of the clinker desalting achieving the depth of the order of 1.5–2%.

1 Claim, No Drawings

PROCESS FOR PRODUCING CEMENT

The present invention relates to processes for producing cement and, more specifically, to processes for producing cement by a low-temperature technology.

Cement is extensively used in civil engineering and construction.

Known in the art are various processes for the production of cement. These processes involve stages of grinding of the raw components, calcination of a raw mixture with the formation of a clinker which is then subjected to grinding.

Certain types of cement have a low hydration rate at low positive (from 0 to 5° C) and negative temperatures (down to −20° C). To accelerate the hydration process for such cements to the final cement is added, in the stage of preparation of concretes and grouts at the above-mentioned temperatures, certain chlorides such as calcium chloride. With increasing amount of the additive, the effect of the latter is also increased. However, this is accompanied by corrosion of steel reinforcement in the final concretes and grouts, especially when the latter are subjected to a thermo-humid treatment. This restricts the amount of the additive of chlorides down to the range of from 2 to 2.5% by weight of cement for normal conditions of hardening of concretes or grouts or to 1–1.5% by weight of cement for a thermal-humid treatment of said concretes and grouts.

Known in the art are certain processes for the production of cement, wherein said chloride additives are incorporated in the raw mixture composition. The clinker produced by this method retains chlorides in its composition which chlorides should be then removed (desalting).

For example, known in the art is a process for the production of cement, wherein the raw components are ground which components comprise, for example, loess loam, limestone, pyrite cinders and calcium chloride, whereafter the resulting raw mixture is delivered into a furnace, wherein it is subjected to a calcination at a temperature ranging between 1,000 and 1,100° C to complete the clinker-formation process. The clinker containing chlorides is crushed in a roll mill at a temperature within the range of from 900 to 1,100° C. Crushing of the clinker is stopped when a desired fraction composition is obtained. The crushed clinker is fed in a downward flow into a silo provided with perforated walls. A heating agent, i.e. the fuel combustion products, is passed through the wall perforations. Contacting of the crushed clinker with the heating agent is effected at the temperature of crushing of the clinker. Under these conditions said chlorides are eliminated, and the thus-desalted material is delivered onto a movable fire grate, wherein it is cooled, and then fed to grinding.

This process features stable operation conditions and a sufficiently high product output. However, present in the resulting clinker are, as a rule, 10 to 20% by weight of fine dust-like fractions with a particle size of below 3 mm which considerably reduce the ability of the heating agent to penetrate into the layer of the crushed clinker. As a result, the desalting degree does not achieve the required value which, in turn, results in impaired properties of the final cement, namely in substantially reduced strength of the cement with time.

The present invention is directed to the provision of such a process for the production of cement which would ensure a sufficient depth of clinker desalting.

This and other objects of the present invention are accomplished by that in the process for the production of cement by grinding a mixture of raw components containing calcium chloride, calcination of the raw mixture at a temperature of from 1,000 to 1,100° C to produce a clinker, crushing said clinker at a temperature of from 900 to 1,100° C, desalting said clinker at a temperature of from 900 to 1,100° C by contacting the crushed clinker with a stream of a heating agent as which use is made of combustion products of the fuel, cooling the resulting desalted clinker, followed by grinding thereof, in accordance with the present invention the crushed clinker prior to desalting is subjected to fractionation by means of a stream of the combustion products of the fuel at a rate of its supply of from 6 to 30 m/sec and at a temperature of from 1,000 to 1,100° C with the formation of two clinker fractions, namely a fraction with a particle size of from 3 to 20 mm and a fraction with a particle size of from 0.1 to 3 mm; desalting of each said fraction is effected separately.

As the starting components of the raw mixture use can be made of the components widely used in the cement industry such as calcareous, aluminous, argillaceous, ferrous components. The proportions of the raw mixture components is selected so as to ensure such a content of a highly-basic calcium silicate, low-basic calcium silicate, calcium aluminate and alumoferrite in the final cement which would make it possible to produce cement having a required mechanical strength.

The presence of calcium chloride in the raw mixture substantially intensifies the process of decarbonization of the starting materials; accelerates the formation of a liquid phase which serves as the principal reaction medium, wherein the clinker-formation occurs at a temperature within the range of between 1,000 to 1,100° C.

As it has been mentioned hereinbefore, the presence of chloride compounds in the clinker results in impaired quality of the final cement. The process of desalting of the clinker is defined by the conditions of heat- and mass- transfer at a thermal decomposition of said chloride compounds. Most intensive processes of heat- and mass-transfer occur at a temperature within the range of between 900 and 1,100° C. The required depth of desalting under these conditions is achieved at a separate desalting of the above-mentioned clinker fractions.

The process for the production of cement according to the present invention is characterized by stable conditions of the desalting stage and said desalting occurs to a sufficient depth.

Comparative data illustrating the production of cement with fractionation desalting and therewithout are shown in the Table hereinbelow.

Table

| Dust-like fractions, wt.% | Starting content of $Cl^-$ in the clinker, wt.% | Residual content of $Cl^-$ in the clinker, wt.% | | |
|---|---|---|---|---|
| | | Without fractionation | With fractionation | |
| | | | Fraction 3–20 mm | Fraction 0.1–3 mm |
| 4 | 5.96 | 3.7 | 1.69 | 1.57 |
| 8 | 5.96 | 3.9 | 1.71 | 1.63 |
| 12 | 5.96 | 4.2 | 1.74 | 1.69 |
| 16 | 5.96 | 4.7 | 1.83 | 1.74 |
| 20 | 5.96 | 5.04 | 2.07 | 1.89 |

It is seen from the data shown in the above Table that the process according to the present invention makes it possible to obtain the desalting depth of the order of 1.5–2%. For this reason, the cement produced by the process according to the present invention possesses a sufficiently high compression strength. Thus, after 28 days of hardening, the cement compression strength is within the range of from 400 to 520 kgf/cm$^2$. Corrosion of steel reinforcement in concrete samples based on the cement produced by the process according to the present invention is not observed.

The process is technologically simple and is performed in the following preferable manner.

A mixture of raw components containing calcium chloride is charged into a mill and ground to a residue of 10% by weight on a sieve with the hole diameter of 80 mcm. The ground raw mixture is fed into a rotary furnace, wherein it is subjected to calcination at a temperature within the range of between 1,000 and 1,100° C to complete the clinker-formation process. The resulting clinker is fed into a roll mill, where in it is crushed to a required fractional composition at a temperature within the range of between 900 and 1,100° C. Then the clinker is fractionated into two fractions by means of a stream of the fuel combustion products at a rate of the latter of from 6 to 30 m/sec and at a temperature within the range of from 1,000 to 1,100° C. A coarse fraction of the clinker with the particle size of from 3 to 20 mm is delivered in a downward dense layer into a silo with perforated walls. Through the perforations in one of the silo walls a stream of a heating agent (the fuel combustion products) is admitted. As a result of the contact between the clinker and heating agent at a temperature of from 900 to 1,100° C chloride compounds are removed. The desalted clinker is further delivered onto a fire grate, whereon it is cooled and then fed to grinding. The fine fraction of the clinker (dust-like fraction) with a particle size of from 0.1 to 3 mm is fed into an auxiliary chamber in a downward stream. The auxiliary chamber has one perforated wall common with the silo and another wall is gas-impermeable. The heating agent from the silo through the perforations of the wall which is a common partition with the auxiliary chamber is fed into the latter. The heating agent contacts with the fine fraction thus resulting in desalting of the fine fraction. The desalted clinker of a small particle size is also fed onto a grate cooler and then to grinding. The stream of the heating agent from the chamber is passed further into the furnace.

For a better understanding of the present invention some specific examples are given hereinbelow by way of illustration.

EXAMPLE 1

A raw mixture is prepared having the following composition, percent by weight:

| | |
|---|---|
| limestone (calculated for CaO) | 40.7 |
| quartz sand (calculated for SiO$_2$) | 18.8 |
| commercial alumina (calculated for Al$_2$O$_3$) | 2.4 |
| pyrite cinders (calculated for Fe$_2$O$_3$) | 1.2 |
| Commercial calcium chloride (calculated for CaCl$_2$) | 6.0 |
| magnesite (calculated for MgO) | 1.5 |
| losses for calcination | 29.4 |

Said components are ground together. The resulting raw mixture is granulated and then delivered into a furnace, wherein it is calcined at the temperature of 1,000° C to complete the clinker-formation process. The calcined clinker is fed onto rolls, wherein it is crushed at the temperature of 900° C. After crushing the dust-like fraction with a particle size of from 0.1 to 3 mm constitutes about 4% by weight. The crushed clinker is subjected to fractionation by means of a stream of the fuel combustion products at the rate thereof of 6 m/sec and the temperature of 1,000° C into two fractions. The coarse fraction with a particle size of from 3 to 20 mm is passed into the silo with perforated walls. The clinker is penetrated by the fuel combustion products fed into the silo from combustion chambers adjacent to one of the silo walls. As a result of the contact between the heating agent and the dense downward stream of the material at the temperature of 1,000° C chloride compounds are removed from the clinker. At the silo outlet the residual content of Cl$^-$ constitutes 1.69% by weight.

The fine fraction with a particle size of from 0.1 to 3 mm is fed into an auxiliary chamber having one perforated wall in common with the silo and the other wall non-perforated. The combustion products passing through the clinker layer in the silo are fed into the chamber, wherein desalting of dust-like fractions occurs at the temperature of 1,000° C upon the contact of the downward stream of dust particles with the transverse streams of the heating agent. After desalting the dust-like fraction has the residual content of Cl$^-$ of 1.57% by weight.

The final cement has the following characteristics: heat-emission, J/g:

| | |
|---|---|
| during the first day of hydration | 132 |
| during the first three days of hydration | 194 |
| ultimate compression strength, kgf/cm$^2$ | 495 |
| corrosion of steel reinforcement in concrete samples produced from the cement | none. |

EXAMPLE 2

A raw mixture is prepared having the following composition, percent by weight:

| | |
|---|---|
| limestone (calculated for CaO) | 35.3 |
| quartz sand (calculated for SiO$_2$) | 13.0 |
| china clay (calculated for Al$_2$O$_3$) | 11.0 |
| pyrite cinders (calculated for Fe$_2$O$_3$) | 0.9 |
| commercial calcium chloride (calculated for CaCl$_2$) | 12 |
| periclase (calculated for MgO) | 4 |
| losses upon calcination | 23.8. |

The cement is produced following the method described in Example 1 hereinbefore, except that the calcination in the furnace is performed at the temperature of 1,050° C and clinker crushing temperature is 1,000° C. The crushed clinker contains 8% by weight of dust-like fractions and its fractionation is effected at the flow rate of hot gases of 12 m/sec. Residual content of Cl$^-$ in the coarse fraction is 1.71% by weight; in the fine fraction that is 1.63% by weight.

The final cement has the following characteristics: heat emission, J/g:

| | |
|---|---|
| during the first day of hydration | 140 |
| during the first three days of hydration | 190 |
| ultimate compression strength, kgf/cm$^2$ | 460 |
| corrosion of steel reinforcement in concrete samples produced from the cement | none. |

EXAMPLE 3

A raw mixture is prepared having the following composition, percent by weight:

| | |
|---|---|
| limestone (calculated for CaO) | 38.3 |
| quartz sand (calculated for SiO$_2$) | 11.1 |
| commercial alumina (calculated for Al$_2$O$_3$) | 11.8 |
| pyrite cinders (calculated for Fe$_2$O$_3$) | 2.5 |
| commercial calcium chloride (calculated for CaCl$_2$) | 4.5 |
| losses upon calcination | 31.8 |

The cement is produced in a manner similar to that described in the foregoing Example 1, except that calcination in the furnace is conducted at the temperature of 1,100° C and the clinker crushing temperature is 1,000° C. The crushed clinker contains 20% by weight of dust-like fractions which are fractionated by means of a stream of hot gases supplied at the rate of 30 m/sec. The residual content of Cl$^-$ in the coarse fraction is 2.07% by weight; that in the fine fraction is 1.89% by weight.

The final cement has the following characteristics: heat emission, J/g:

| | |
|---|---|
| during the first day of hydration | 138 |
| during the first three days of hydration | 196 |
| ultimate compression strength, kgf/cm$^2$ | 512 |
| corrosion of steel reinforcement in concrete samples produced from the cement | none. |

What is claimed is:

1. A process for producing cement comprising grinding a mixture of starting components containing calcium chloride, calcining the raw mixture at a temperature within the range of between 1,000 and 1,100° C to form a clinker; crushing said clinker at a temperature within the range of between 900 and 1,100° C; fractionating the crushed clinker at a temperature of from 1,00 to 1,100° C by a stream of fuel combustion products at a speed of said stream of from 6 to 30 m/sec to produce two clinker fractions, said two fractions being a fraction with a particle size of 3 to 20 mm and a fraction with a particle size of 0.1 to 3 mm; separately desalting said clinker fractions at a temperature within the range of between 900 and 1,100° C by contacting said clinker fractions with a stream of fuel combustion products; cooling the desalted clinker, and grinding said cooled desalted clinker.